F. BISEK.
ICE CUTTING MACHINE.
APPLICATION FILED JAN. 11, 1912.

1,125,941.

Patented Jan. 26, 1915.
6 SHEETS—SHEET 1.

Fig. 1

Witnesses

Inventor
F. Bisek,
By
Attorneys

UNITED STATES PATENT OFFICE.

FRANK BISEK, OF ALEXANDRIA, MINNESOTA.

ICE-CUTTING MACHINE.

1,125,947. Specification of Letters Patent. Patented Jan. 26, 1915.

Application filed January 11, 1912. Serial No. 670,654.

*To all whom it may concern:*

Be it known that I, FRANK BISEK, a citizen of the United States, residing at Alexandria, in the county of Douglas, State of Minnesota, have invented certain new and useful Improvements in Ice-Cutting Machines; and I do hereby declare the following to be a full, clear, and exact description of the invention, such as will enable others skilled in the art to which it appertains to make and use the same.

This invention relates to motor operated ice cutting machines.

The principal object of the invention is to provide an ice cutting machine of the character described in which there is provided a novel construction of tractor wheel for the same.

Another object of the invention is to provide a machine of the character described in which there is provided separate means for elevating both the tractor wheel and the saw.

Another object of the invention is to provide an ice cutting machine including a frame having transversely disposed runners attached thereto and means for raising and lowering said runners.

A further object of the invention is to provide an auxiliary saw for cutting a groove in the ice, in which one of the runners of the frame is adapted to ride, and by means of which uniform strips of ice may be cut.

A further object of the invention is to provide a novel form of gearing for the tractor wheel whereby said wheel may be rotated in either direction.

A still further object of the invention is to provide a machine of the character described, which is extremely simple in construction, is capable of being operated by one person, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings.

Like reference numerals designate corresponding parts in all the figures of the drawings.

Figure 1:
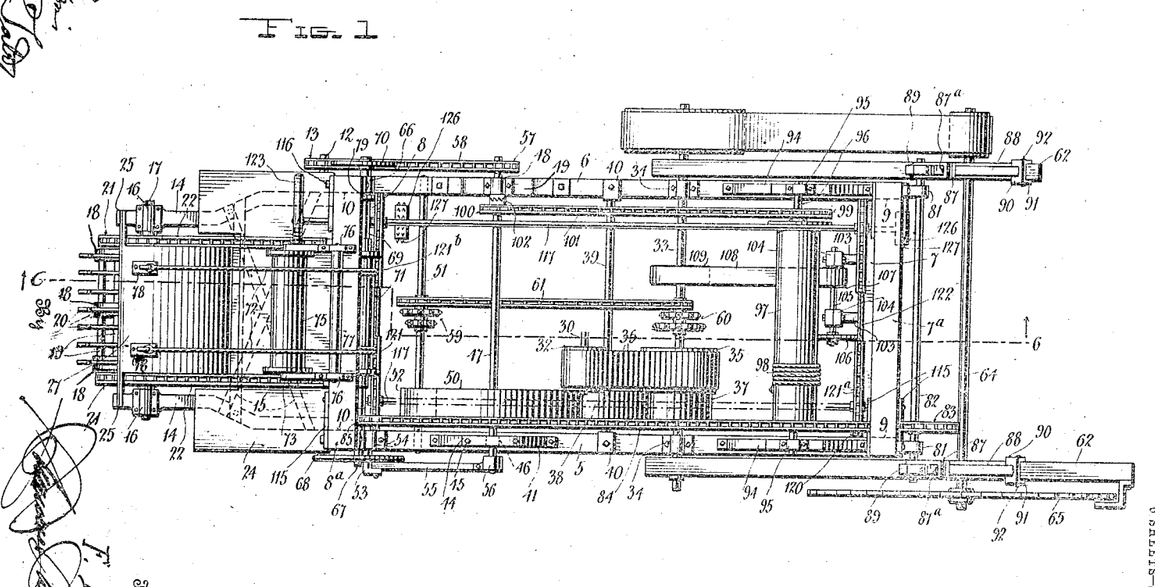
Figure 1 is a top plan view of an ice cutting machine constructed in accordance with my invention, the engine and the cover being omitted.
Figure 2:
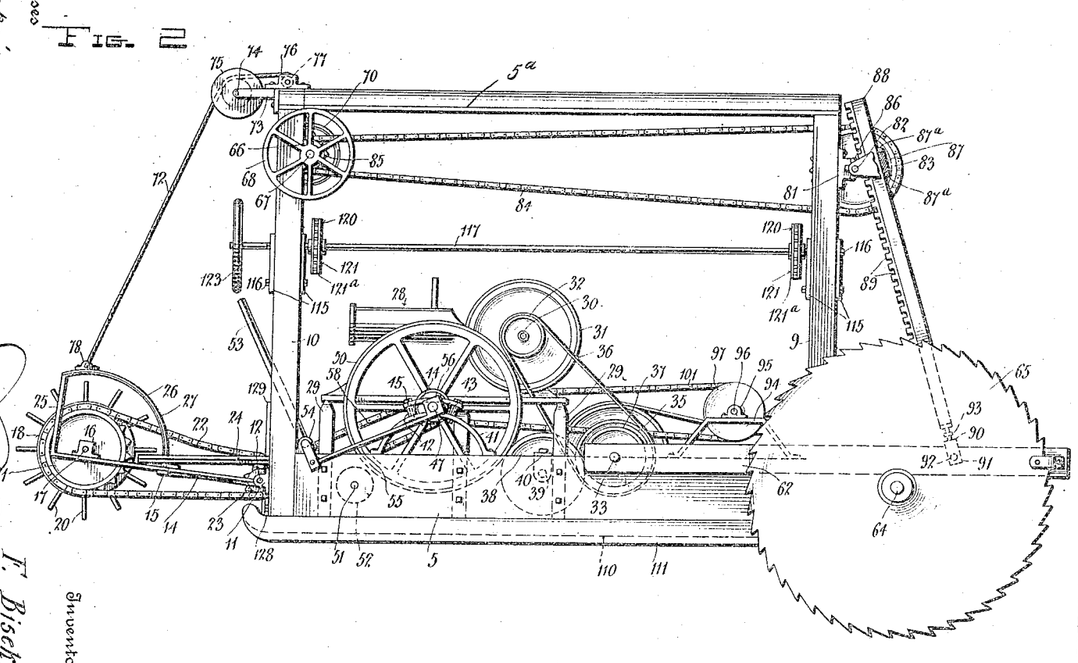
Fig. 2 is an elevation of the right hand side thereof.
Figure 3:
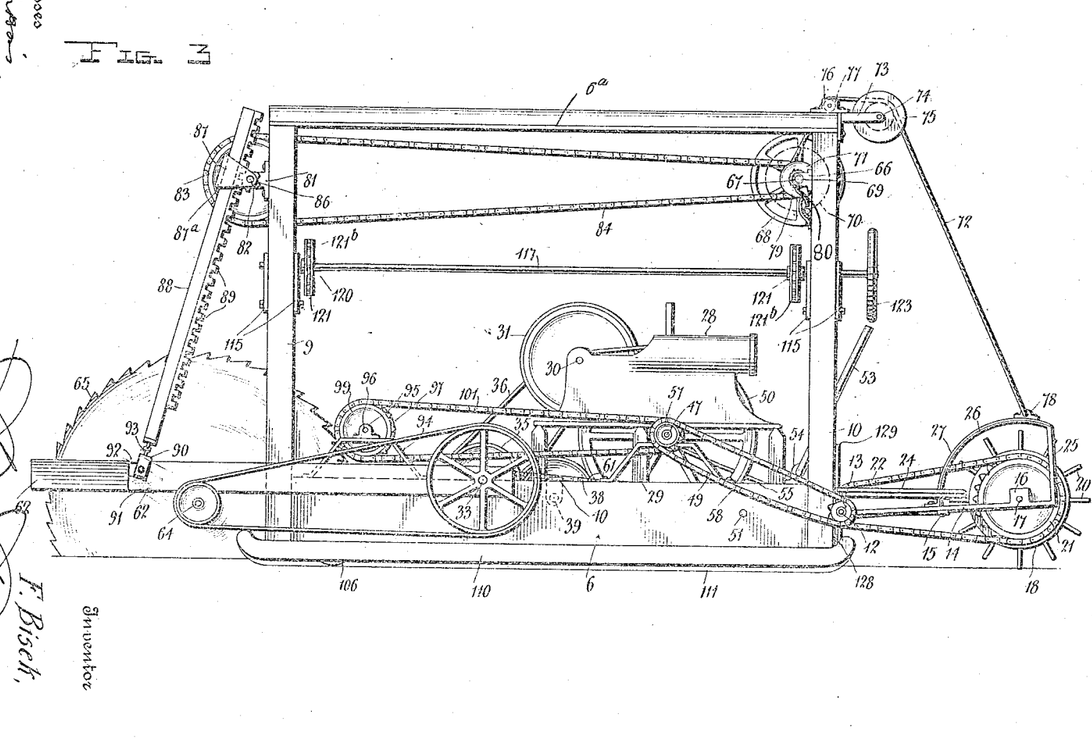
Fig. 3 is an elevation of the left hand side thereof.
Figure 4:
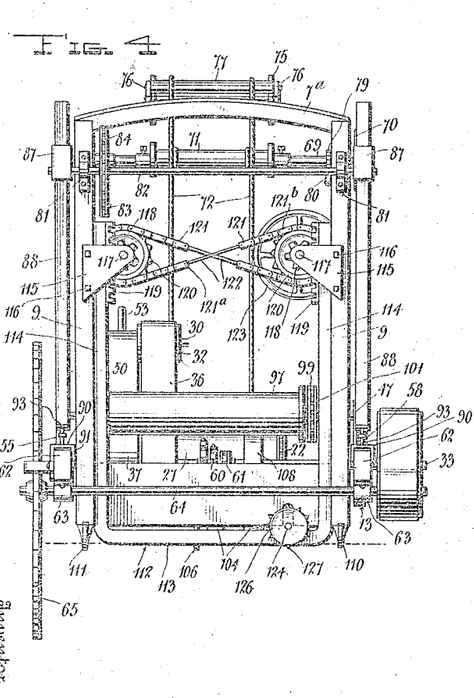
Fig. 4 is a front end view of the same.
Figure 5:
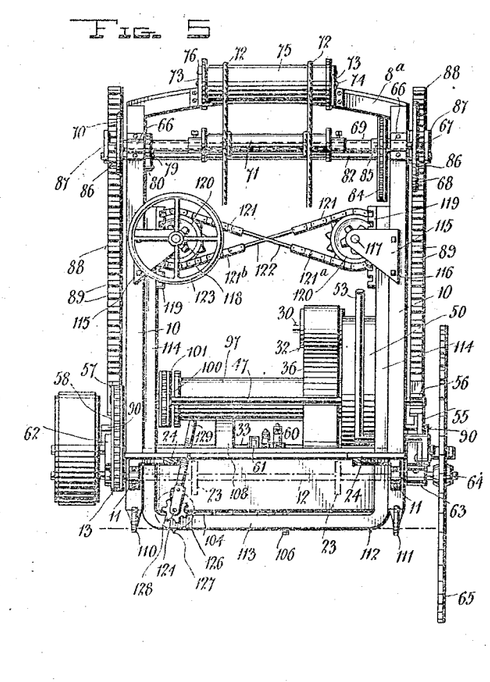
Fig. 5 is a rear end view of the same.
Figure 6:
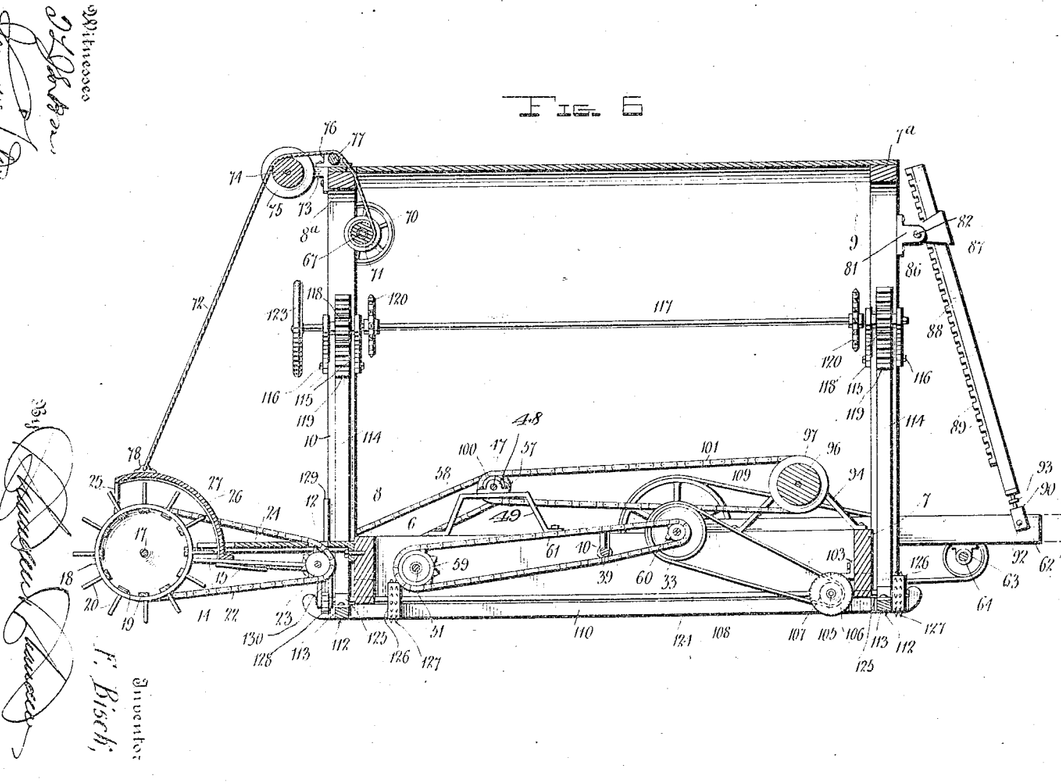
Fig. 6 is an irregular vertical longitudinal sectional view through the machine taken on the line 6—6 of Fig. 1, parts thereof being shown in elevation.
Figure 7:
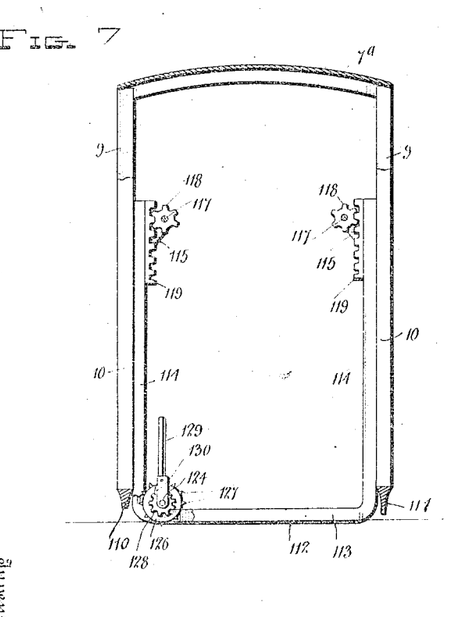
Fig. 7 is a vertical cross sectional view through the machine showing the frame raised.

Referring to the drawings, the invention comprises a main frame which includes lower longitudinal sills 5 and 6 respectively, which are connected at their ends by lower end sills 7 and 8 respectively. Secured to the respective ends of the frame are front uprights 9—9 and rear uprights 10—10. The upper ends of these uprights are connected by upper end sills 7$^a$ and 8$^a$. A cover is provided for the machine as clearly shown resting upon the sills 7$^a$ and 8$^a$ in Fig. 6 of the drawings.

Secured to the lower ends of the uprights 10 are bearings 11—11, which are transversely disposed in alinement, and mounted in these bearings is a transverse shaft 12. One end of this shaft extends beyond the longitudinal sill 6 of the frame, and has attached thereon a sprocket wheel 13. Connected to the bearings 11 and extending rearwardly therefrom are spaced arms 14—14 which form part of a tractor wheel frame. These arms are held against lateral movement by means of cross braces 15—15. Mounted upon the outer ends of the arms 14 are bearings 16—16, which are disposed in alinement and in which is mounted a shaft 17. Rotatably mounted upon the shaft 17 is a plurality of spaced supporting elements 18 and to the rims thereof are connected a plurality of longitudinal bars 19, the elements and the bars constituting a rotating cylinder. Secured to each bar 19 and projecting radially therefrom is a plurality of pointed teeth 20 adapted to engage the ice to propel the machine, as will be hereinafter more fully explained. In order to rotate the tractor wheel there is mounted upon the shaft 17 between the outer elements 18 and the adjacent bearing 16, sprocket wheels 21—21 which are respectively connected by chains 22—22 to gear wheels 23—23 mounted upon the shaft 12. A platform 24 is suitably connected to the main frame, and is disposed between the frame and the tractor wheel and above the supporting arms 14. Secured to the outer end of each arm 14 is a guard frame, which includes a vertical arm 25 and an arcuate arm 26. Connecting the arcuate arms 26 of the guard frame is a guard plate 27, said guard plate being disposed in spaced relation to the teeth 20 of the tractor wheel.

Figure 8:
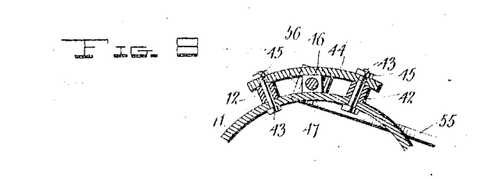
Fig. 8 is a detail sectional view through a portion of the controlling means.
Figures 9, 10:
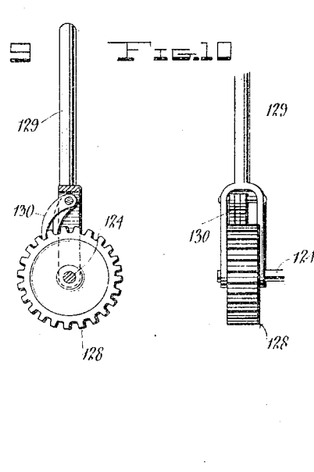
Fig. 9 is a view partly in elevation and partly in section of the manually controlled driving means.
Fig. 10 is an end view of the same.

A motor 28 of any suitable type is supported upon the main frame by means of braces 29, and this motor includes the usual driving shaft 30 and fly wheel 31. Also secured upon the driving shaft 30 is a pulley 32. A countershaft 33 is transversely supported in bearings 34—34, which are carried by the lower longitudinal sills 5 and 6 of the frame. This shaft is disposed slightly in advance of and below the driving shaft 30 of the motor. Secured upon this shaft is a pulley 35 which is in alinement with the pulley 32, and is operatively connected therewith by means of a belt 36. Also secured upon the shaft 33 is a friction wheel 37, which is always in mesh with a friction idler 38, the latter being mounted upon a second countershaft 39, which is transversely disposed and supported by brackets 40—40 mounted upon the lower sills 5 and 6 of the frame. Secured upon lower longitudinal sill 5 of the main frame in rear of the idler 38 is an arcuate bracket 41, see Fig. 8 and radially and upwardly projecting from the central portion of the bracket are spaced blocks 42—42 which are each connected to the bracket by means of a bolt 43. Disposed upon the outer ends of the blocks is an arcuate bar 44 through which the bolts 43 pass, and is secured in place by means of nuts 45 engaged with the bolts 43. Slidably mounted between the bracket 41 and the bar 44 is a bearing block 46, in which is mounted one end of a third countershaft 47. This shaft extends across the frame and the other end of said shaft is journaled in a bearing 48 mounted upon a bracket 49, which is carried by the longitudinal sill 6 of the frame. Secured upon the shaft 47 is a friction gear 50, which is adapted to mesh with the idler 38. A fourth countershaft 51 is disposed in rear of and below the shaft 47, and has its ends journaled in suitable bearings formed in the lower sills 5 and 6 of the frame. Mounted upon the shaft 51 is a friction idler 52, which is adapted to be engaged by the friction gear 50 when the latter is disengaged from the idler 38. In order to shift the friction gear 50 to either of the idlers 38 or 52, there is provided a hand lever 53, which is fulcrumed to a bracket 54 carried by the main frame and directly in advance of the platform 24. The lower end of the lever 53 is connected to one end of a rod 55, the other end of the rod being connected to a block 56 mounted upon the shaft 47 and disposed between the bracket 41 and the bar 44. It will thus be observed that upon forward movement of the lever 53 the friction gear 50 will be forced into engagement with the idler 52, and upon rearward movement of the lever 53, the gear 50 will be disengaged from the idler 52 and engaged with the idler 38. Mounted upon one end of the shaft 47 is a sprocket wheel 57 which is in alinement with the sprocket wheel 13, and is connected therewith by means of a chain 58. A plurality of different sized sprocket gears 59 are mounted upon the shaft 51, and mounted upon the shaft 33 and in alinement with said gears 59 are reversely arranged sprocket wheels 60, any pair of said gears 59 and 60 being adapted to be connected by means of a chain 61.

It will thus be observed that in driving the machine forward motion is transmitted from the engine shaft 30 to the shaft 33, thence through the gear wheel 60, chain 61 and gear 59 to the shaft 51. Thence, by means of the idler 52 to the friction gear 50, thence by means of the shaft 47 to the sprocket gear 57, and by means of the chain 58 to the shaft 12 and from said shaft to the tractor wheel. When it is desired to reverse the tractor wheel, the hand lever 53 is moved rearwardly to draw the friction gear 50 in engagement with the idler 38. As a result, the rotation of the tractor wheel will be reversed, by reason of the fact that the idler 38 is disposed directly between the friction gears 37 and 50.

The shaft 33 projects beyond the side sills 5 and 6 of the main frame, and pivotally supported on said projecting ends are forwardly extending arms 62—62 forming a part of a saw supporting frame. These arms project in advance of the main frame, and secured upon the projecting end of each arm is a bearing 63. Disposed within these bearings is a saw arbor 64, which carries a circular saw 65, said saw being disposed at one side of the main frame and preferably on that side on which the operating lever 53 is disposed. The diameter of the saw 65 is of a size to project considerably below the frame when the arms 62 are in their normal or horizontal positions.

When it is desired to shift the frame laterally the tractor wheel and the saw will necessarily have to be raised, and in order to effect this operation, I have provided the following mechanism: Mounted upon the rear uprights 10 and adjacent the upper ends thereof are bearings 66—66. Mounted within the bearings 66 is a transverse shaft 67, said shaft projecting beyond the ends of the uprights 10. Mounted upon one of the projecting ends is a hand wheel 68, by means of which the shaft 67 can be rotated. Loosely mounted upon the shaft 67 is a sleeve 69 to which is attached a hand wheel 70, the latter being on the opposite side of the machine from the hand wheel 68 and being adapted to rotate the sleeve. Fixedly mounted upon the sleeve is a winding drum 71 to which is connected the ends of cables 72—72. Secured to the upper end sill 8$^a$ and projecting rearwardly therefrom are spaced brackets 73—73, and journaled in said brackets is a shaft 74 upon which is loosely mounted a roller 75 over which the cables 72 pass. Also mounted upon the end sill 8$^a$ in advance of the roller 75 are spaced brackets 76—76, in which is journaled a smaller roller 77 over which the cables 72 are trained. The other ends of the cables 72 are fixedly connected to clips 78—78 carried by the guard plate 27 of the tractor wheel. It will thus be observed that upon rotation in one direction of the hand wheel 70 the sleeve 69, and consequently the drum 71, will be rotated and the tractor wheel frame will be swung upwardly upon the shaft 12. Secured upon the sleeve 69 is a ratchet wheel 79, and pivotally secured upon the adjacent upright 10 is a dog 80 adapted for engagement with any of the ratchet teeth to hold the drum 71 against rotation, and thereby retain the tractor wheel frame in its elevated position. Secured upon the upper ends of the uprights 9 are alined bearings 81—81 and journaled in said bearings is a shaft 82, upon which is secured a sprocket wheel 83 adapted to receive motion through means of a sprocket chain 84 which is trained over a sprocket wheel 85 mounted upon the shaft 67. The shaft 82 projects beyond the uprights 9 of the frame, and mounted upon each projecting end of the shaft is a pinion 86. Guide plates 87 are each pivotally mounted upon the shaft 82 around a respective pinion 86. Slidably mounted within each of the guide plates 87 is a rack bar 88, the teeth 89 thereof being engaged with the respective pinion 86. Carried by each of the guides 87 are rollers 87$^a$, which engage the longitudinal edge of the rack bar opposite the teeth 89 thereof, so as to permit said bar to easily slide within the clip. Secured to the forward end of each arm 62 of the saw supporting frame is an inverted U-shaped clip 90, the legs 91 thereof being pivotally connected to a bolt 92, which is disposed within a suitable opening formed in said arm. A turn buckle 93 is respectively connected at its ends to the rack bar 88 and the bight of the clip 90.

It will thus be observed that upon rotation of the hand wheel 68 in one direction, the sprocket wheel 85 will be rotated, and as a result, motion will be imparted through the chain 84 to the forward shaft 82, and through the rotation of this shaft the pinions 86 will be rotated to raise the rack bars 88 and consequently the saw frame. Mounted upon the forward ends of the lower longitudinal sills 5 and 6 are brackets 94—94, and supported upon these brackets are bearings 95—95 in which is disposed a transverse shaft 96. Mounted upon the shaft 96 is a winding drum 97 around which is trained a cable 98 adapted for elevating blocks of ice cut by the machine. In order to rotate this drum, there is mounted upon the shaft 96 a sprocket wheel 99, and mounted upon the shaft 47 and in alinement with the sprocket wheel 99 is another sprocket wheel 100, the said sprocket wheels being connected by a chain 101. A suitable clutch, designated as a whole by the reference numeral 102, is associated with the shaft 47 for engagement with the sprocket wheel 100, and is adapted to throw the drum 97 into or out of gear, as will be readily understood.

The invention further comprises a novel means for guiding the machine over the ice in a manner to cut blocks of ice of uniform widths. For this purpose there is mounted upon the lower end sill 7 a pair of rearwardly supporting arms 103—103. Carried by the free ends of these arms are alined bearings 104—104, in which is journaled a short transverse arbor 105, and upon one end of the arbor is mounted an auxiliary saw 106, said saw projecting slightly below the base of the main frame. In order to drive this saw, there is mounted upon the arbor 105 a pulley 107, which is connected by means of a belt 108 to a pulley 109 mounted upon the countershaft 33. It will thus be observed that when the machine is moved along over the ice, the saw 106 will be caused to cut a groove in the ice. Disposed below the main frame and secured to the lower longitudinal sills 5 and 6 thereof are longitudinal runners 110—111 respectively. The runner 111 which is on the right hand side of the machine and contiguous to the main saw 65, is of a depth somewhat greater than the other of said runners, and is adapted to ride in the groove formed by the saw 106. It will be seen that when the machine runs forwardly the saw 65 will cut a slit in the ice and the auxiliary saw 106 will cut a groove therein. The machine is then by the means hereinafter described laterally shifted so that the relatively wide runner 111 seats in the groove. The machine is then run backwardly cutting a second slit in the ice and the auxiliary saw cutting a second groove in the ice. The machine is then again shifted laterally so that the runner 111 rides in and is guided by the second groove when the machine is moved forwardly to cut the third slit in the ice. This operation is repeated as desired, the grooves cut by the auxiliary saw 106 serving to guide the machine and cause it to travel in a straight line.

It is often desired to shift the machine laterally, especially when blocks of greater widths are desired to be cut. In order to accomplish such movement, it is necessary to elevate the entire frame. In order to elevate the frame, there is provided at either end of the machine, vertically movable runners which are designated as a whole by the numeral 112. Each of these runners is formed from a bar of iron and bent into U-shaped formation to form a bight 113, which constitutes the runner, and legs 114—114. The runners are disposed transversely of the machine and the legs are disposed vertically, and are movably mounted between the end uprights 9—9 and 10—10 respectively. In order to guide these runners, there is attached to each of the uprights 9 and 10 opposed plates 115—115, each pair being connected to the respective upright by means of transverse bolts 116. Formed in the inner ends of the plates are openings, which are arranged in longitudinal alinement for respectively receiving longitudinal shafts 117—117. Secured upon the shafts and between each respective pair of plates 115 is a pinion 118, which meshes with a rack bar 119 that is detachably connected to the adjacent leg 114 of the runner. Mounted upon each of the shafts 117 is a sprocket wheel 120, and trained over these sprocket wheels is a crossed chain 121. This chain consists of end sections 121ª and 121ᵇ, and the ends of these sections are respectively connected by short rods 122. These rods are adapted to meet intermediate the sprocket wheels 120, and thereby permit of said section easily passing one another. In order to actuate this chain, there is mounted upon the forward end of one of the shafts 117 a hand wheel 123. It will thus be observed that upon movement of the hand wheel 123, both shafts 117 will be rotated, and through the medium of the pinions 118 the runners 112 will be elevated or lowered depending upon the direction of rotation of said hand wheel.

In order to shift the machine laterally when the runners 112 are disposed upon the ice, there is provided a longitudinal shaft 124, which is journaled in suitable bearings 125—125 carried by the runners 112. Mounted upon this shaft is a plurality of spur wheels 126, each having teeth 127 adapted for engagement with the ice. This shaft and consequently the spur wheels are manually operated by means of a ratchet mechanism, consisting of a ratchet wheel 128 which is mounted upon the rear end of the shaft 124. Fulcrumed upon the shaft 124 is a hand lever 129 with which is associated a dog 130 for engagement with the teeth of the ratchet wheel 128. It will thus be observed that upon the oscillation of the hand lever 129, the dog 130 will engage the teeth of the ratchet wheel 128 and cause the shaft 124 to be rotated and consequently the spur wheels 126 will be caused to move the machine laterally.

What is claimed is:—

1. An ice cutting machine including a main frame, vertically movable transverse runners carried by the frame, means for raising and lowering said runners, a longitudinal shaft carried by the runners, spur wheels carried by the shaft, and operating means connected to the shaft for actuating said spur wheels.

2. An ice cutting machine including a main frame, vertically movable transverse runners carried by the frame, means for raising and lowering said runners, a longitudinal shaft carried by the runners, spur wheels carried by the shaft, operating means connected to the shaft for actuating said spur wheels, said means consisting of a ratchet wheel carried by the shaft, a hand lever fulcrumed upon the shaft, and a dog carried by said lever engageable with the teeth of the ratchet wheel.

3. In an ice cutting machine, a main frame including spaced front and rear pairs of uprights, U-shaped runners transversely disposed between the respective pairs of said uprights, guides for the runners carried by the uprights, rack plates connected to the legs of the runners, longitudinal shafts journaled in said guides, pinions carried by the shafts for engaging the rack plates of said runners, and means for simultaneously actuating said shaft to raise and lower said runners.

4. In an ice cutting machine, a main frame including spaced front and rear pairs of uprights, U-shaped runners transversely disposed between the respective pairs of said uprights, guides for the runners carried by the uprights, rack plates connected to the legs of the runners, longitudinal shafts journaled in said guides, pinions carried by the shafts for engaging the rack plates of said runners, means for simultaneously actuating said shafts to raise and lower said runners, and means carried by the runners for shifting the machine laterally when said runners are in their lowered positions.

5. An ice cutting machine including a main frame, a motor carried by the frame, an ice cutting saw supported by the frame, driving means for the saw connected to the motor, longitudinal runners carried by the frame, one of said runners being deeper than the other, an auxiliary saw supported by the frame for forming a groove for receiving the deeper of said runners, and driving means connecting the auxiliary saw and the motor.

In testimony whereof, I affix my signature, in presence of two witnesses.

FRANK BISEK.

Witnesses:
I. M. ENGEBRETON,
C. C. MIDDENTS.